Patented July 13, 1926.

1,591,999

UNITED STATES PATENT OFFICE.

LAWRENCE V. REDMAN, OF CALDWELL, NEW JERSEY, ASSIGNOR TO BAKELITE CORPORATION, OF NEW YORK, N. Y., A CORPORATION OF DELAWARE.

LIQUID COATING COMPOSITION.

No Drawing. Application filed October 11, 1922, Serial No. 593,908. Renewed October 25, 1924.

This invention relates to compositions, and more particularly to coating compositions, containing resins of the phenolic condensation product type; and comprises a liquid coating composition containing such resin, an aqueous alkaline solvent therefor, and an aldehyde (or equivalent body having aldehyde functions) which is of lower reactivity than formaldehyde or hexamethylenetetramine, and which is capable of functioning both as a diluent for the alkaline solution and as a hardening agent for the resin. The aldehyde body which I preferably employ is furfural, either alone or in conjunction with other aldehydes or aldehyde-derivatives such as formaldehyde, hexamethylenetetramine, acetaldehyde, or paracetaldehyde, and the like: but other aldehydes or aldehyde-derivatives which resemble furfural in respect to having a materially lower degree of reactivity toward the phenolic resins than formaldehyde may be substituted for furfural without departure from my invention. For example, butylaldehyde may be so employed.

It is known, in accordance with United States Patent 1,085,100, granted January 27, 1914, to L. H. Baekeland, that phenolic resins, of either the reactive or non-reactive type, may be dissolved in water containing the minimum proportion of alkali hydroxid requisite for the preparation of a stable solution; and that the solutions so prepared are available for many uses in the arts, being employed for example as coating compositions; for the impregnation of porous materials such as cement, stone, wood, paper, fabrics and the like; or for compounding molding mixtures. As compared with solutions of the same resins in alcohol and other organic solvents, these resins derived from aqueous alkaline solutions are decidedly more reactive, undergoing the transformation to the infusible state in a shorter time and also at a lower temperature. As is now well understood in this art, this transformation is brought about by the agency of so-called "hardening agents" which usually comprise a mobile methylene group (either substituted or not), and include formaldehyde and its polymers, formaldehyde derivatives of the methylene-amin type, as well as other aldehydes of higher molecular weight, such as acetaldehyde, benzaldehyde, and furfuraldehyde (furfural), which contain substituted methylene groups and behave similarly to formaldehyde in this reaction. As is also well understood, and as explained in the Baekeland patent above mentioned, the hardening agent may be incorporated in sufficient proportion with the phenolic body to yield directly a reactive resin, that is to say a resin which is capable of transformation by simple heating to the infusible final product: or it may be incorporated in such lesser proportion as will yield as the first reaction product a phenolic resin of the non-reactive or permanently soluble and fusible type; which resin, after being freed from any undesired excess of free phenol, may be admixed with the requisite amount of a hardening agent, and converted thereby into a potentially reactive resin, essentially similar to that prepared by the direct or single-step method first above mentioned.

The potentially reactive resins in aqueous alkaline solution, whether prepared by the single-step or double-step method, are rather viscous, and consequently possess a relatively low penetrating power. This limits their application to some extent, particularly for the manufacture of laminated products, composite cardboard and the like, where highly penetrative solutions are often desired. Moreover the very high reactivity of these resins is often a drawback in this particular application, especially when the resin is applied to the paper or fabric in powder form, and the coated sheets are superposed and consolidated by heat and pressure. In this case a slowly reacting resin is desirable, as affording time after fusing and before attaining the infusible stage, for a satisfactory penetration of the paper, fabric or other fibrous base.

For all such applications, and for other applications in this art, it is desirable to provide a potentially reactive resin in an aqueous solution of relatively low viscosity and high penetrating or impregnating capacity, the resin being also preferably less reactive than those prepared in accordance with Patent 1,085,100 above mentioned. I have discovered that these several advantages may be attained by the use as a hardening agent for the phenolic resin of furfuraldehyde (furfural). This substance, which has recently become available in considerable quantity, is an excellent solvent for the non-reactive resin; and by virtue of its aldehyde character is of course capable of serving as a hardening agent therefor. It is moreover soluble in or miscible with water, and also with the aqueous alkaline solutions of the resin. While its hardening action on the phenolic resins is essentially similar to that of formaldehyde, it is decidedly less reactive or more slowly reactive than this substance, which as already stated is a desirable characteristic in certain applications in which it is desired that the potentially reactive composition should remain for appreciable periods in the fused state before undergoing the reaction which yields the ultimate hard and infusible condensation product. The furfural is not merely a diluent for these aqueous alkaline solutions, but in addition to counteracting the viscosity of the solutions and increasing their penetrating power, it imparts to them an excellent flowing quality, which is of great importance in the covering of either porous or non-porous surfaces. Moreover as already explained, it is capable of functioning as a hardening agent in the final transformation.

The following is a typical procedure in accordance with this invention, it being understood that the invention is not restricted to the proportions or manipulations as therein set forth:

I first prepare a phenolic resin of the non-reactive, or permanently fusible soluble type, by any of the known methods, such for example as by reacting upon phenol with hexamethylenetetramine in the approximate proportions of 7.5 mols. of phenol to 6 mols. of active methylene, the latter being added as hexamethylenetetramine or any equivalent body, such as a reactive aldehyde. The resulting resin may be subjected to the usual treatment for the elimination of excess phenol, and is dissolved in an alkaline solution, preferably water containing about 5 percent of caustic soda. One pound of resin to about two pounds of the caustic soda solution is a satisfactory proportion. I then dilute the solution by the addition of furfural, introducing in a typical case about 3.5 mols. of furfural for each 7.5 mols. of phenol in the original resin, thereby obtaining a potentially reactive composition containing about 9.5 active methylenes to 7.5 mols. phenol. By "potentionally reactive composition" a term now well understood by those familiar with this art, I designate such phenolic condensation products as are initially fusible and soluble but are transformable by simple heating for a sufficient time and at an appropriate temperature into a hard and infusible body. The resulting solution is ready for use in any of the manifold ways now familiar to those skilled in this art. Its penetrative and flowing qualities, in conjunction with its relatively slow reaction rate, render it especially suitable for the manufacture of composite cardboard in accordance with the Baekeland Patent 1,019,406 of March 5, 1912. For this application the sheets of paper or fabric are coated or impregnated with the solution, and are permitted to dry, advantageously in a current of air at room temperature, avoiding in any case such heating as will prematurely transform the resin. The coated or impregnated sheets are then superposed and consolidated in a press with steam heated platens in the manner now well understood in the art.

A modification of the above procedure is to dry the sheets in a current of air containing some carbon dioxid. Thereby the sodium present as hydroxid or phenolate is transformed to carbonate, which although not a solvent for the resin is equally effective as the hydroxid in the final hardening. It is to be noted that in this modification the alkali is retained in the non-carbonated state as long as its solvent action upon the resin is required,—that is to say until the solution has been spread or otherwise employed according to the particular application in view; and is then converted into the carbonate, as a step preliminary to the transformation of the resin into its hard and infusible form.

In the illustrative example given above the furfural is employed as the sole hardening agent, and is used in the proper molecular proportion to the phenol to accomplish this result. It is within my invention, however, to substitute any proportion of the furfural by equivalent hardening agents of the aldehyde type, as formaldehyde, hexamethylenetetramine or the like, the effect of such substitution being to increase correspondingly and progressively the reactivity of the composition. Or alternatively I may provide sufficient hexamethylenetetramine or its equivalents to accomplish the hardening, while adding the furfural simply as a diluent for the solution and for its plasticizing effect on the final product. Or as already explained, I may replace the furfural by other bodies possessing the necessary aldehyde character, but characterized by a higher molecular weight than formaldehyde and a relatively low degree of reactivity toward the phenolic resin.

I claim:—

1. A potentially reactive liquid coating composition comprising a phenolic resin, an aqueous alkaline solvent therefor, and an aldehyde body capable of functioning both as a diluent for the solution and as a hardening agent for the resin.

2. A potentially reactive liquid coating composition comprising a phenolic resin, an aqueous alkaline solvent therefor, and a hardening agent for said resin, said hardening agent having a materially lower degree of reactivity than formaldehyde.

3. A potentially reactive liquid coating composition comprising a phenolic resin, an aqueous alkaline solvent therefor, and a hardening agent for said resin, said hardening agent comprising an aldehyde of higher molecular weight than formaldehyde and a materially lower degree of reactivity.

4. A potentially reactive liquid coating composition comprising a phenolic resin, an aqueous alkaline solvent therefor, and furfural.

5. A potentially reactive liquid coating composition comprising a phenolic resin, an aqueous alkaline solvent therefor, furfural and another methylene-containing hardening agent.

6. A liquid coating composition containing a phenolic condensation product which is capable of transformation by heat into an infusible body, and a solvent comprising aqueous alkali and furfural.

In testimony whereof, I affix my signature.

LAWRENCE V. REDMAN.